United States Patent [19] [11] 4,367,305
Satoh et al. [45] Jan. 4, 1983

[54] SAPONIFIED ETHYLENE-VINYL ACETATE COPOLYMERS IMPROVED IN BEHAVIOR IN THE MOLTEN STATE

[75] Inventors: Kenji Satoh; Taichi Negi; Kenji Matsumoto, all of Okayama, Japan

[73] Assignee: Kuraray Company, Ltd., Kurashiki, Japan

[21] Appl. No.: 262,975

[22] Filed: May 12, 1981

[30] Foreign Application Priority Data

May 21, 1980 [JP] Japan ................................. 55-68281

[51] Int. Cl.³ ............................................. C08L 29/04
[52] U.S. Cl. .................................... 524/398; 524/295; 524/296; 524/321; 524/413; 525/60; 525/62; 528/485; 528/486; 528/487; 528/496
[58] Field of Search ...................... 525/4, 60; 528/485; 524/398, 413, 295, 296, 321

[56] References Cited

U.S. PATENT DOCUMENTS 3,510,464 5/1970 Sato et al. ............................... 525/60
4,041,223 8/1977 Amemiya et al. ..................... 525/60
4,140,668 2/1979 Sumi et al. ...................... 260/33.2 R

FOREIGN PATENT DOCUMENTS 46-37664 11/1971 Japan .
48-5781 2/1973 Japan .
48-25084 4/1973 Japan .
51-88544 8/1976 Japan .
52-954 1/1977 Japan .
52-956 1/1977 Japan .
52-88545 8/1977 Japan .

*Primary Examiner*—Stanford M. Levin
*Attorney, Agent, or Firm*—Oblon, Fisher, Spivak, McClelland & Maier

[57] ABSTRACT

A saponified ethylene-vinyl acetate copolymer composition, improved in behavior in the molten state, which comprises: a saponified ethylene-vinyl acetate copolymer, with an ethylene content of 20–80 mole percent and a saponification degree of at least 85 percent, and 0.00005 to 0.005 percent by weight, based on said copolymer, of manganese, copper or mixtures thereof; said composition, when extracted with pure water, giving an acidic extract, is disclosed, along with a method of making the same.

7 Claims, No Drawings

SAPONIFIED ETHYLENE-VINYL ACETATE COPOLYMERS IMPROVED IN BEHAVIOR IN THE MOLTEN STATE

BACKGROUND OF THE INVENTION

1. Field of the Invention

This invention relates to improvements in the thermal stability and flowability, in the molten state, of saponified ethylene-vinyl acetate copolymers.

2. Description of the Prior Art

Saponfied ethylene-vinyl acetate copolymers are generally produced by saponifying ethylene-vinyl acetate copolymers with a caustic alkali or an alkali metal alcoholate. When the saponification products are subjected to melt molding or melt film-forming, they are susceptible to thermal degradation, whereby the melt viscosity decreases and discoloration takes place to an extent preventive of practical use thereof. For the saponification products to be practicable, improvement both in thermal stability and in moldability is essential.

So far a number of measures for improving these properties have been proposed. For example, Japanese Patent Publication No. 37664/1971 and Japanese patent application Kokai (laid open) Nos. 25048/1973, 88544/1976 and 88545/1976 disclose that adequate washing of the resin with water, addition of an acid thereto or immersion thereof in an acid solution can prevent heat degradation or heat discoloration to some extent. Japanese Patent Publication No. 5781/1973 and Japanese patent application Kokai No. 954/1977 disclose the addition of metal salts of a certain kind, which are claimed to have a remarkable stabilizing effect, for improving thermal stability of the resins. Furthermore, Japanese patent application Kokai No. 956/1977 discloses that coexistence of such an acid and such a salt can produce a favorable synergistic effect and at the same time stabilize the hydrogen ion concentration of the treating solution.

However, these prior art methods, though effective to a certain extent, cannot overcome the dilemma that satisfactory improvement in thermal stability can be achieved only at the cost of flowability in the molten state; whereas, adequate improvement in flowability can be attained only at the cost of thermal stability. Decreased flowability may result in roughened film surface and, in extreme cases, fish eye formation or film break, and insufficient thermal stability may lead to remarkable discoloration during melt molding.

Furthermore, the most fatal disadvantage in the prior art is that heating in an oxidizing atmosphere, such as air, for a relatively long period of time not only causes saponified ethylene-vinyl acetate copolymers to become unmeltable, whereby the copolymers cannot remain in the molten state even with continued heating, but also causes discoloration to a yellow to yellowish brown color. Even if the saponified copolymers can be melted with heating, the melting is very often incomplete and the surface of the melted resin bears a yellow to yellowish brown color. Since saponified ethylene-vinyl acetate copolymers are thermally stable under acidic conditions, most of the prior art methods of stabilization against heat consist in maintaining the saponified copolymers within an acidic range. However, the higher the acidity of the saponified copolymer is, the more significant the above-mentioned phenomena of becoming unmeltable and discolored upon heating in an oxidizing atmosphere is. The prior art techniques thus cannot solve such a dilemma, hence the prior art techniques cannot provide saponified ethylene-vinyl acetate copolymers having good melt moldability.

A need therefore continues to exist for saponified ethylene-vinyl acetate copolymer compositions having a high degree of thermal stability and a good flowability in the molten state, hence a good melt moldability, and a method of making the same.

SUMMARY OF THE INVENTION

Accordingly, one object of the invention is to provide saponified ethylene-vinyl acetate copolymer compositions having a high degree of thermal stability and a good flowability in the molten state, hence a good melt moldability.

Another object of the invention is to provide a method of making saponified ethylene-vinyl acetate copolymer compositions having a high degree of thermal stability and a good flowability in the molten state.

Briefly, these objects and other objects of the invention as hereinafter will become more readily apparent can be attained by providing a saponified ethylene-vinyl acetate copolymer composition improved in behavior in the molten state, in which the copolymer has an ethylene content of 20–80 mole percent and a saponification degree of at least 85% and which is characterized in containing manganese and/or copper in an amount of 0.00005–0.005 percent by weight and that, when extracted with pure water, gives an acidic extract. The pH measurement for the extract is made, for example, after an approximate equilibrium has been reached by extraction using a Soxhlet's extractor for about 3 hours.

It is especially preferred that the extract obtained by extraction of 20 g of the saponified copolymer composition with 100 ml of pure water has a pH value in the range of 3.5–6.5 as measured at 25° C. It is also preferred that the acid to be used is an organic acid or a mixture of organic acids, which has an acidity constant, pKa, of 3.5–5.5 as measured at 25° C.

The present invention also provides a method of preparing such saponified copolymer compositions which comprises immersing a saponified ethylene-vinyl acetate copolymer in an aqueous solution containing a manganese salt and/or a copper salt as well as an acid so that the treated copolymer has a manganese and/or copper content of 0.00005–0.005 percent by weight and that extraction of the treated copolymer with pure water gives an acidic extract.

DETAILED DESCRIPTION OF THE PREFERRED EMBODIMENTS

The present inventors have searched for a method of preventing the above-mentioned saponified copolymers from becoming unmeltable and discolored under acidic conditions, and as a result have found that specific metals not only can prevent the saponified copolymers from becoming unmeltable under acidic conditions but also are very effective in preventing discoloration of the copolymers. This finding has led to the present invention which has overcome the above-mentioned problems and provides saponified ethylene-vinyl acetate copolymer compositions having good melt moldability.

The invention thus provides saponified ethylene-vinyl acetate copolymer compositions improved in behavior in the molten state, in which the copolymer has an ethylene content of 20–80 mole percent and a saponification degree of at least 85 percent and which are characterized in that they contain manganese and/or copper in an amount of 0.00005-0.005 percent by weight and that, when extracted with pure water, they give an acidic extract. The pH measurement for the extract is made, for example, after an approximate equilibrium has been reached by extraction using a Soxhlet's extractor for about 3 hours.

Saponified ethylene-vinyl acetate copolymers are generally produced by saponifying ethylene-vinyl acetate copolymers with a caustic alkali or an alkali metal alcoholate, followed by washing the saponification products with water so as to remove sodium acetate and other byproducts of saponification. When the saponification products are extracted with pure water, the extracts often have a pH value of not less than 7, which is within the range of alkalinity. In such a case, the saponification products are susceptible to thermal degradation under the temperature conditions of melt molding or melt film-forming and such degradation leads to a decrease in melt viscosity and remarkable discoloration. Therefore, it is necessary, for the prevention of thermal degradation and improvement of thermal stability, that the saponification products be modified by immersion in an aqueous solution of an acid prior to drying or by adding an acid directly to the saponification products so that the above-mentioned pH value is less tha 7, namely in the acidic region. As mentioned previously above, the saponified ethylene-vinyl acetate copolymers with said pH value in the acidic range, when heated, become unmeltable with the lapse of time. Such phenomenon tends to occur, especially, in an oxidizing atmosphere, such as air, and increases in intensity with increasing acidity.

The present invention removes these disadvantageous properties inherent in saponified ethylene-vinyl acetate copolymers by making the most of the unique action of specific metals, while maintaining the saponified copolymers in the acidic range so as to improve them in thermal stability. Thus, in accordance with the invention, the metal to be used is manganese or copper or a mixture of these. The level of addition of the metal is 0.00005-0.005 percent by weight as manganese or copper or as the total of these metals based on the saponified copolymer. Addition of a compound containing said metal, such as in a salt form or in a salt mixture form, can prevent the saponified copolymers not only from becoming unmeltable under heating but also from becoming significantly discolored.

The effect of the invention is based on the unique action of manganese and copper. Other metals including the ones which are found in the neighborhood of these in the Periodic Table, such as chromium and cobalt, cannot produce any effect of the same nature.

Since the amount of said metal to be added to the saponified copolymers is very small, one of the suitable techniques for homogeneous addition is to immerse the saponified copolymers in a solution of a water soluble salt of said metal. The special effect of the two specific metals is very distinct, and it is a special feature of the present invention that the desired effects are produced with a very small amount of the metal or metals. Preferably the metal content is in the range of 0.001-0.003 percent by weight. At addition levels of less than 0.00005 percent by weight, the effect of the invention cannot be fully produced, whereas, at levels exceeding 0.005 percent by weight, homogeneous dispersion of the metal in the resin composition can hardly be attained, and in extreme cases, spots are found on the surface of the resin melt. In film forming, such a resin melt leads to fish eye formation.

The above-mentioned pH value for the saponified copolymer composition of the present invention is preferably 3.5-6.5. If said pH value is less than 3.5, namely in the range of strong acidity, the resins become unmeltable in a very significant manner and consequently require higher contents of the metal salts in accordance with the invention for prevention of such phenomenon. Higher metal contents inevitably produce problems associated with dispersibility of the additives and resins, and saponified resin compositions of an adequate quality can hardly be obtained.

The unique effect of the specific metals in accordance with the invention cannot be produced if said pH value is in the alkaline range. Even if said pH value is within the range of 6.5-7.0, the effect is still insufficient for stabilization of the resins against heat.

In the practice of the present invention, it is necessary that the saponified resins should contain an acid so that said pH condition can be satisfied. For this purpose, most known acids can be used. The only requirement is that the acids are stable under temperature conditions of molding, generally at temperatures of 210°-230° C. With stronger acids, adjustment of the addition level may be difficult in practice, whereas, with weaker acids, the higher addition levels required may sometimes pose a problem of odor of the treated saponified resin compositions. In general, inorganic acids are strong acids, and it is often difficult to maintain the resins within an adequate pH range using inorganic acids alone. Therefore, addition of inorganic acids should preferably be restricted to such levels that alkaline salts such as sodium, calcium, magnesium and potassium salts, which are contained in the resins, be converted to salts of the inorganic acids added. The balance should preferably be made up by the use of acids having a lower acidity.

The acids to be used are required to be thermally stable under temperature conditions of melt molding or melt film forming. Since, in molding of the saponified resins, the waste material is recovered for reuse, it is preferred that the acids have an evaporation loss which is as small as possible. Among acids of the same order of volatility, those which are required at the lowest addition level are most preferable. The acids may be used not only each alone but also in combination of two or more of them.

From the above-mentioned viewpoint, organic acids having a pKa value of 3.5-5.5 or a mixture thereof are preferred as the acids to be used in the practice of the present invention. Said pKa is the acidity constant, or the negative logarithm of the dissociation constant K, at 25° C. For polybasic acids, it means the acidity constant for the primary dissociation.

It is usual, in practice, that the saponified copolymers are prepared by saponification of ethylene-vinyl acetate copolymers with a caustic alkali or an alkali metal alcoholate and that the impurities or byproducts, such as sodium acetate, are removed by washing with industrial water. Therefore, the saponification products often contain not only sodium originating from sodium acetate but also calcium, magnesium and so on in the form of basic salts, in higher concentrations as compared with the concentrations in said industrial water as a result of adsorption thereof. As a result, when the saponification products are extracted with 100 ml per 20 grams of said product of pure water to an approximate equilibrium, with a Soxhlet's extractor for 3 hours, for instance, the extracts are often alkaline. Especially, calcium and magnesium, though small in concentration in industrial water, are accumulated as a result of adsorption by the saponification products, and thus cause the extracts to be alkaline, which means that the saponification products become more susceptible to thermal degradation. So far, such a fact has never been recognized. In the prior art, large amounts of water are used in washing the saponification products for removing impurities therefrom as completely as possible, but the amount of magnesium and calcium, among others, adsorbed on the resins increases with increasing amounts of water, so that the thus-washed saponification products have inadequate thermal stability. This fact has been beyond anticipation from the previous knowledge in the art, but has just been revealed by the present inventors. Based on this finding, the inventors have succeeded in sharply reducing the amount of acids required to be added to the saponification products by washing the same with water almost free of these metal ions, such as water treated with ion exchange resins (deionized water). In this washing procedure, the rate of removal of metal salts or metal ions can preferably be increased by using water almost free of metal ions, such as deionized water, with a small amount of an acid added thereto, preferably to a pH of 5 or less. Furthermore, the washing and addition of an acid in accordance with the present invention can preferably be carried out simultaneously by selecting the acidity of the washing water so that the pH of the extract can fall within the range of 3.5–6.5 and by selecting the acid to be added to the deionized water in accordance with the present invention. The removal of metal salts by washing the resins with water almost free of metal ions prior to addition of acids to the resins is especially effective for reducing the amount of acids to be added especially when the acids are relatively volatile.

The acids usable in the practice of the invention include, among others, acetic acid, propionic acid, succinic acid, adipic acid, valeric acid, glutaric acid, benzoic acid, isophthalic acid, terephthalic acid, sebacic acid, toluic acid and tartaric acid. Acidic salts such as potassium dihydrogen phosphate and sodium dihydrogen phosphate may also be used similarly as or in combination with the acids mentioned above.

The saponified ethylene-vinyl acetate copolymers to be used in this invention should have an ethylene content of 20–80 mole percent and a saponification degree of at least 85 percent. When the ethylene content is above 80 mole percent, the effect of the invention is not very significant. On the other hand, when the ethylene content is lower than 20 mole percent, the melting point of the resins increases, coming up to the decomposition point, whereby melt molding or melt film forming becomes difficult to perform. When the degree of saponification is below 85 percent, even the resins treated in accordance with the present invention, while in molten state, are discolored to a significant extent and moreover the phenomenon of the resins becoming unmeltable upon heating in an oxidizing atmosphere cannot be prevented in a significant manner.

The term "ethylene-vinyl acetate copolymers" as used herein includes not only copolymers of ethylene and vinyl acetate alone but also copolymers representable by the general formula

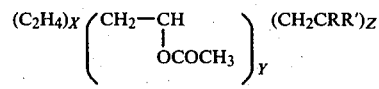

wherein $X/Y=0.25–4.0$, $Z/Y=0–0.1$, R is H or methyl and R' is methyl or COOR. Thus, those ethylene-vinyl acetate copolymers containing a third component as shown in the above formula can also enjoy the effect of the present invention. The ethylene content expressed in terms of mole percent is the value calculated by the formula $100X/(X+Y)$.

Having generally described this invention, a further understanding can be obtained by reference to certain specific examples which are provided herein for purposes of illustration only and are not intended to be limiting unless otherwise specified.

EXAMPLE 1

Saponification was carried out by blowing methanol vapor into a mixture of 45 parts by weight of an ethylene-vinyl acetate copolymer, with an ethylene content of 32.5 mole percent, and 1 part by weight of caustic soda at 110° C. and at 3.5 kg/cm² (gate) for 30 minutes, while distilling off the methyl acetate, which formed during the reaction, with methanol. The caustic soda remaining in the saponification mixture was neutralized with acetic acid, and then a vapor phase mixture of water and methanol was blown into the saponified polymer solution, while allowing a vapor rich in methanol to come off. There was thus obtained a paste-like liquid containing 35 percent by weight of a saponified copolymer with a saponification degree of 99.2 percent in a mixture of methanol and water (methanol/water weight ratio=7/3). This liquid was extruded through a die with an aperture diameter of 2 mm into a water/methanol mixture which contained 10 percent by weight of methanol. The resulting strand-like coagulation product was cut into pellets having a length of 2.5–3.5 mm. The pellets were subjected to continuous countercurrent extraction/washing using 18 parts by weight of industrial water per part by weight (pure resin basis) of the pellets so as to remove the impurities contained in the pellets, such as methanol and sodium acetate. After the washing, the pellets were immersed in an aqueous solution of acetic acid (acetic acid concentration=2 g/liter) in a countercurrent manner, and then washed with water until the washings had a pH of 5.3.

A portion of the thus-treated pellets was dried at 120° C. for 24 hours. The volatile matter content of the dried pellets was 0.21 percent, the total content of the four metals, calcium, magnesium, potassium and sodium, was 0.00035 percent, and the pH of an extract obtained by extracting 20 g of the resin with 100 ml of pure water in a Soxhlet's extractor for 3 hours was 4.9. An attempt to melt the resin by heating at 210° C. for 10 minutes failed. The pellets were intensely discolored to a yellowish brown color while almost retaining their original form without melting.

Another portion of the above-mentioned pellets after washing with industrial water was subjected to treatment with an aqueous acetic acid solution having an acetic acid concentration of 2 g/liter in the same manner as above, followed by washing with pure water. After draining off the washing solution, the resin was treated with an aqueous solution of manganese (II) acetate having a manganese concentration of 0.0003 percent by weight. The pellets were then dried at 120° C. for 24 hours. After the drying, the volatile matter content of the resulting resin composition was 0.23 percent, the total content of the four metals, calcium, magnesium, sodium and potassium was 0.0003 percent by weight, and the manganese content was 0.0004 percent by weight. The extract obtained by extracting 20 g of the resin composition with 100 ml of pure water in a Soxhlet's extractor had a pH of 5.1. When heated at 210° C. for 10 minutes, the resin composition melted easily and completely, the surface of the melt was smooth and there was noted no sign of discoloration to a yellow or yellowish brown color at all. The resin composition was quite satisfactory as a material for molding; after 10 passes through a molding die, no coloration to a yellow or yellowish brown color was noted and the number of fisheyes found on a film formed from the resin composition was as small as 2 per square meter.

EXAMPLE 2

Proceeding similarly as in Example 1, pellets of a saponified ethylene-vinyl acetate copolymer with an ethylene content of 34.2 mole percent and a saponification degree of 98.9 mole percent were prepared and then washed with water so as to remove impurities such as methanol and sodium acetate. The washed pellets were treated by immersing the same in an aqueous solution containing 0.08 percent by weight of adipic acid and 0.0015 percent by weight of manganese in the form of manganese acetate. After drainage, the pellets were dried at 120° C. for 24 hours. For the resulting dried resin composition, the total content of calcium, magnesium, sodium and potassium was 0.0125 percent by weight, the manganese content was 0.0021 percent by weight, and the extract obtained by extracting 20 g of the resin composition with 100 ml of pure water in a Soxhlet's extractor had a pH of 4.2. When heated at 210° C. for 6 minutes, the resin composition melted easily and the melt had a smooth surface and no discoloration to a yellow or yellowish brown color was observed. The dried resin composition was further heated at 120° C. for 24 hours in air and then heated at 210° C. for 10 minutes, upon which it melted easily and showed a smooth melt surface without any discoloration. The resin composition was satisfactory as a molding material. Thus, even after 7 repeated molding procedures, no change was noted in quality and, in film forming, only two fisheyes per square meter were found.

COMPARATIVE EXAMPLE 1

The procedure of Example 2 was followed except that the pellets obtained after washing for removal of methanol, sodium acetate and other impurities were treated with an aqueous solution containing adipic acid alone (i.e., without addition of manganese acetate). After drying, the total content of calcium, magnesium, sodium and potassium was 0.0122 percent by weight and the extract from the resin composition had a pH of 4.22. When heated at 210° C. for 10 minutes, the dried resin melted only incompletely. The melt surface was not smooth but uneven, and thus the behavior in molten state was quite unsatisfactory. Moreover, the heated resin composition became discolored to a yellow to yellowish brown color. Separately, the dried resin composition was heated in air at 120° C. for 24 hours. This heat treatment did not cause melting, but the pellets almost retained their original form and became intensely discolored to a yellow to yellowish brown color.

EXAMPLE 3

The procedure of Example 2 was followed except that succinic acid was used in place of adipic acid and that the succinic acid concentration was 0.07% by weight and the manganese acetate was used at a manganese concentration of 0.001% by weight. After drying, the resin composition had a manganese content of 0.0014% by weight and the extract obtained therefrom using pure water had a pH of 4.6. When heated at 210° C. for 6 minutes, the dried resin composition melted easily and the melt had a smooth surface. No discoloration was noted. Even after maintaining the molten state for 12 minutes, no discoloration was noted.

The dried resin composition was heated in air at 120° C. for 24 hours. When heated at 210° C. for 10 minutes, the heat-treated resin composition melted easily and the melt had a smooth surface and no discoloration was noted.

COMPARATIVE EXAMPLE 2

The procesure of Example 3 was followed except that manganese acetate was not added. Extraction of the resulting resin composition with pure water gave an extract having a pH of 4.62. When heated at 210° C. for 6 minutes, the resin composition melted only incompletely, and the melt had an uneven surface, thus revealing an unsatisfactory melting behavior, and moreover became discolored to a yellow to yellowish brown color. The heating time was extended to 20 minutes, which did not cause any change in melting state but caused increased discoloration. Heating of the resin composition at 210° C. for 10 minutes following a heat treatment in air at 120° C. for 24 hours did not lead to melting of the composition but allowed the pellet form to remain for the most part; discoloration was significant.

EXAMPLE 4

A solution composed of 94 parts by weight of an ethylene-vinyl acetate copolymer with an ethylene content of 45 mole percent, 104 parts by weight of methanol and 2 parts by weight of caustic soda was subjected to saponification by the procedure of Example 1 to give a paste-like solution of a saponified copolymer resin with a saponification degree of 98.5 percent in a methanol-water mixture (methanol/water weight ratio=4). This solution was subjected to coagulation followed by cutting, to give pellets having a diameter of 2.3 mm and a length of 2.7–3.5 mm. The pellets were extracted with 20 parts by weight per part by weight (pure resin basis) of the pellets in deionized water acidified with benzoic acid to pH 4.5 in a countercurrent manner so as to remove impurities such as methanol and sodium acetate.

After drainage, the pellets were immersed in an aqueous solution of copper (II) acetate having a copper concentration of 0.0003% by weight, then drained and dried at 120° C. for 24 hours. The volatile matter content was 0.25%. The copper content in the dried resin was 0.0005% by weight, and the aqueous extract obtained by extracting 20 g of the resin with 100 ml of pure water had a pH of 5.0. When heated at 210° C. for 10 minutes, the resin melted easily. The surface of the melt was smooth. Discoloration to a yellow to yellowish brown color was not noted. The resin was satisfactory as a molding material like the one obtained in Example 1.

COMPARATIVE EXAMPLE 3

The procedure of Example 4 was followed except that the immersion in the aqueous copper (II) acetate solution was omitted. When the resin dried at 120° C. for 24 hours was heated at 210° C. for 10 minutes, the resin did not melt but almost retained the pellet form. Upon this heating, the resin was discolored to a yellow to yellowish brown color.

EXAMPLE 5

The procedure of Example 4 was followed except that propionic acid was used in place of benzoic acid. After the drying at 120° C. for 24 hours, the volatile matter content was 0.21%. The copper content in the dried resin was 0.0004% by weight, and the aqueous extract obtained by extracting 20 g of the resin with 100 ml of pure water had a pH of 4.9. Upon heating at 210° C. for 6 minutes, the resin melted easily and completely. The melt had a smooth surface, but discoloration to a yellow to yellowish brown color was not noted. Further heating of the resin at 120° C. for 24 hours did not cause any change in melting behavior. No discoloration was noted either.

COMPARATIVE EXAMPLE 4

The procedure of Example 5 was followed except that the immersion in the aqueous copper (II) acetate solution was omitted. After the drying at 120° C. for 24 hours, the resin was heated at 210° C. for 10 minutes, upon which the resin melted only incompletely and became discolored to a yellow to yellowish brown color.

EXAMPLE 6

The procedures of Example 1, Example 2 and Example 3 were respectively followed except that manganese sulfate was used in place of manganese acetate. In the respective cases, the results obtained were similar to those obtained in the corresponding previous examples.

EXAMPLE 7

The procedures of Example 4 and Example 5 were respectively followed except that copper sulfate was used in place of copper (II) acetate. The result obtained were similar to those obtained in the corresponding examples.

EXAMPLE 8

The procedures of Example 1, Example 2, Comparative Example 1, Example 3 and Comparative Example 2 were respectively followed except that a copolymer of 35 mole percent of ethylene, 2 mole percent of propylene and 63 mole percent of vinyl acetate was used in place of the ethylene-vinyl acetate copolymer with an ethylene content of 32.5 mole percent.

The degree of saponification of the saponified copolymer was 99%, and the results obtained in the respective cases were similar to those obtained in the corresponding previous examples and comparative examples.

EXAMPLE 9

Pellets of a saponified ethylene-vinyl acetate copolymer with an ethylene content of 32.5 mole percent were prepared by proceeding as in Example 1 and washed with deionized water so as to remove impurities such as methanol and byproduct sodium acetate. The total content of calcium, magnesium, potassium and sodium in the dried resin was 0.0018%.

(A) The resin was immersed in an aqueous solution of potassium dihydrogen phosphate (potassium dihydrogen phosphate content=0.04%), then drained and dried at 120° C. for 24 hours.

(B) Separately, the resin was treated similarly as in treatment (A) above except that manganese acetate was added to the aqueous solution of potassium dihydrogen phosphate to a manganese concentration of 0.001% by weight.

The extract obtained by extracting 20 g of the pellets with 100 ml of pure water in a Soxhlet's extractor for 3 hours had a pH 5.37. The manganese content in the pellets subjected to treatment (B) was 0.0014% by weight.

When the dried pellets were heated at 210° C. for 6 minutes, the pellets obtained by treatment (A) melted unevenly and incompletely with the melt surface uneven and unsmooth, whereas the pellets obtained by treatment (B) melted uniformly and completely with the melt surface being quite smooth. When the dried pellets were heat-treated at 120° C. for 24 hours and then heated at 210° C. for 10 minutes, the pellets obtained by treatment (A) gave a melt having an increased unevenness, whereas the pellets obtained by treatment (B) gave a melt having surface as smooth as before without any change. The former melt was discolored to a yellow to yellowish brown color, while the latter showed no sign of discoloration.

EXAMPLE 10

The procedure of Example 2 was followed except that a mixture of manganese acetate and copper (II) acetate was used in place of manganese acetate, the immersing solution having a manganese concentration of 0.001% by weight and a copper concentration of 0.0005% by weight. The manganese and copper contents in the dried resin were 0.0014% by weight and 0.0008% by weight, respectively. The extract obtained from the resin had a pH of 4.15. The other results obtained were similar to those described in Example 2.

COMPARATIVE EXAMPLE 5

The procedure of Example 2 was followed except that manganese acetate was used in a manganese concentration of 0.0054% by weight. The manganese content in the dried resin was 0.0078% by weight, and the extract obtained by extracting 20 g of the resin with 100 ml of pure water in a Soxhlet's extractor had a pH of 4.3. When heated at 210° C. for 6 minutes, the resin melted and the melt had a smooth surface. However, the resin melt surface was tinted slightly with a pale brown color, and a number of brown spots appeared. When the dried resin was heat-treated in air at 120° C. for 24 hours and then heated at 210° C. for 10 minutes, it melted normally as before but the whole resin was discolored to a pale brown color with an increased number of brown spots appearing. Therefore, the resin was unsatisfactory as a molding material. In film forming, a large number of minute fisheyes were revealed.

Having now fully described this invention, it will be apparent to one or ordinary skill in the art that many changes and modifications can be made thereto without departing from the spirit or scope of the invention set forth herein.

What is claimed as new and desired to be secured by Letters Patent of the United States is:

1. A saponified ethylene-vinyl acetate copolymer composition, improved in behavior in the molten state, which comprises: a saponified ethylene-vinyl acetate copolymer, with an ethylene content of 20-80 mole percent and a saponification degree of at least 85 percent, and 0.00005 to 0.005 percent by weight, based on said copolymer, of manganese, said composition, when extracted with pure water, giving an acidic extract.

2. The saponified copolymer composition of claim 1, wherein said composition, when extracted with 100 ml of pure water per 20 grams of the composition, gives an extract with a pH value of 3.5-6.5 at 25° C.

3. The saponified copolymer composition of claim 2, wherein said composition contains an organic acid having a pKa value of 3.5-5.5 or a mixture of organic acids each having a pKa value of 3.5-5.5, said pKa being the acidity constant at 25° C. or, for the case of a polybasic acid, the acidity constant for the primary dissociation at 25° C.

4. A method of producing a saponified ethylene-vinyl acetate copolymer composition, improved in behavior in the molten state, which comprises: immersing a saponified ethylene-vinyl acetate copolymer, with an ethylene content of 20-80 mole percent and a saponification degree of at least 85 percent, in an aqueous solution containing a water-soluble compound of manganese and an acid so that the thus-treated copolymer contains 0.00005-0.005 percent by weight of manganese and that said treated copolymer when extracted with pure water gives an acidic extract.

5. The method of producing a saponified ethylene-vinyl acetate copolymer composition according to claim 4, wherein said composition, when extracted with pure water, gives an extract with a pH value of 3.5-6.5.

6. The method of producing a saponified ethylene-vinyl acetate copolymer composition according to claim 4, wherein said water-soluble compound of manganese is a water-soluble salt of manganese.

7. The method of producing a saponified ethylene-vinyl acetate copolymer composition according to claim 4 or 5, wherein said acid is an organic acid having a pKa value of 3.5-5.5 or a mixture of organic acids each having a pKa value of 3.5-5.5, said pKa being the acidity constant at 25° C. or, for the case of polybasic acid, the acidity constant for the primary dissociation at 25° C.

* * * * *